United States Patent
Sun et al.

(10) Patent No.: US 8,184,618 B2
(45) Date of Patent: May 22, 2012

(54) METHODS AND APPARATUS FOR USE IN A PACKET DATA NETWORK

(75) Inventors: Joseph T. Sun, Milpitas, CA (US); Cathleen N. Carroll, Cupertino, CA (US); Renu Chaudhary, Sunnyvale, CA (US); Leland Doon, San Francisco, CA (US); Cynthia M. Jung, Menlo Park, CA (US); John E. Malek, San Jose, CA (US)

(73) Assignee: Motorola Solutions, Inc., Schaumburg, IL (US)

(*) Notice: Subject to any disclaimer, the term of this patent is extended or adjusted under 35 U.S.C. 154(b) by 847 days.

(21) Appl. No.: 11/537,795

(22) Filed: Oct. 2, 2006

(65) Prior Publication Data
US 2007/0091820 A1    Apr. 26, 2007

Related U.S. Application Data

(60) Provisional application No. 60/729,898, filed on Oct. 25, 2005.

(51) Int. Cl.
*H04L 12/66* (2006.01)

(52) U.S. Cl. ........ 370/352; 370/328; 370/329; 370/330; 370/337; 370/338; 370/356; 370/389; 370/394; 455/435.1; 455/435.2; 709/223; 709/227; 709/228; 709/229

(58) Field of Classification Search .................. 370/338, 370/329, 330, 337, 351, 352, 353, 354, 355, 370/356, 389, 394, 328; 455/435.1, 435.2, 455/435.3; 709/223, 227, 228, 229
See application file for complete search history.

(56) References Cited

U.S. PATENT DOCUMENTS

| | | | | |
|---|---|---|---|---|
| 6,240,464 B1 * | 5/2001 | Fijolek et al. | ................. | 709/250 |
| 6,678,732 B1 * | 1/2004 | Mouko et al. | ................. | 709/227 |
| 6,687,252 B1 * | 2/2004 | Bertrand et al. | ............. | 370/401 |
| 6,763,012 B1 * | 7/2004 | Lord et al. | .................... | 370/338 |
| 6,954,790 B2 * | 10/2005 | Forslow | ......................... | 709/227 |
| 7,246,176 B2 * | 7/2007 | Mizell et al. | ................. | 709/245 |
| 7,277,706 B2 * | 10/2007 | Hurtta et al. | ............... | 455/435.1 |
| 7,342,925 B2 * | 3/2008 | Cherchali et al. | ............. | 370/389 |
| 7,568,048 B2 * | 7/2009 | Murakami | .................... | 709/245 |
| 8,090,828 B2 * | 1/2012 | Leung et al. | ................. | 709/226 |
| 2001/0017856 A1 * | 8/2001 | Asokan et al. | ................ | 370/389 |
| 2002/0141352 A1 * | 10/2002 | Fangman et al. | ............. | 370/254 |
| 2003/0204627 A1 * | 10/2003 | Mizell et al. | ................. | 709/245 |
| 2004/0008653 A1 | 1/2004 | Cohen | | |

* cited by examiner

*Primary Examiner* — Olumide T Ajibade Akonai
(74) *Attorney, Agent, or Firm* — Valerie M. Davis (57) ABSTRACT

A GGSN receives a request associated with a session creation for a mobile entity. The GGSN begins a process (a four-way handshake) for obtaining network access configuration parameters for the mobile entity and responds to the request prior to the completion of the four-way handshake. The GGSN then completes the four-way handshake. A GGSN creates an association between a first IP address and a first mobile entity and thereafter requests an IP address for a second mobile entity. In response thereto, the GGSN receives the first IP address, which the GGSN declines for the second mobile entity and reserves for the first mobile entity. The GGSN requests an IP address for the second mobile entity a second time and receives a second IP address that is different from the first IP address.

13 Claims, 5 Drawing Sheets

METHODS AND APPARATUS FOR USE IN A PACKET DATA NETWORK

FIELD OF THE INVENTION

The present invention relates generally to an Internet Protocol (IP) network and more specifically to an accelerated response for session creation and to resolution of overlapped IP addresses when interacting with a Dynamic Host Configuration Protocol (DHCP) server.

BACKGROUND OF THE INVENTION

When a mobile entity (ME) (also commonly referred to in the art as a mobile node) such as a radio, phone, laptop, Personal Digital Assistant (PDA), etc., desires to communicate with another mobile entity (for instance a second ME connected to a home network of the first ME) using a packet data network, the first ME establishes a session (also known as a call) with the second ME. In establishing a session, the first ME may further need to obtain network access configuration parameters to communicate using the network. Network access configuration parameters are parameters that control how a mobile entity accesses the network at its point of attachment and how the mobile entity transmits and receives packets on the network, wherein a packet is defined generally herein as a message transmitted over a network from one entity to another and may include, but is not limited to, an IP datagram. Examples of network access configuration parameters are an Internet Protocol (IP) address, security policies such as whether encryption and/or a Virtual Private Network (VPN) will be used for the session, etc.

One example of a packet data network is a network structured in accordance with the GPRS (General Packet Radio Services) standard. The GPRS standard is described, for example, in European Telecommunications Standards Institute (ETSI) document number EN 301 347 v7.5.1 and all related versions (collectively referred to hereinafter as the GPRS standard or standard GPRS). When a ME wants to establish a session using a GPRS network, the ME can connect to a Global System for Mobile (GSM) radio network, for instance, which in turn connects to GPRS infrastructure via an entity in the GPRS infrastructure called a Serving GPRS Support Node (SGSN). The SGSN in turn communicates with another entity comprising the GPRS infrastructure called a Gateway GPRS Support Node (GGSN). Before the session can be created, a data structure called a PDP (Packet Data Protocol) Context is established for the ME in both the SGSN and the GGSN using standard GPRS, and the PDP context comprises the mobile entity's session information for the session. This session information for example includes, but is not limited to, an IP address that the ME will be using during the session. In some instances, the GGSN may need to obtain the IP address (along with other network access configuration parameters) from a server in the home network running DHCP in accordance with the Internet Engineering Task Force (IETF) Request for Comments (RFC) 2131 titled "Dynamic Host Configuration Protocol" also referred to herein as standard DHCP.

The known way for establishing a session and for requesting network access configuration parameters has some shortcomings. For example, with respect to session creation, the ME has to wait until all four messages in a four-way handshake between the GGSN and the DHCP server (e.g., DHCP-DISCOVER, DHCPOFFER, DHCPREQUEST AND DHC-PACK) are exchanged before the session creation can be completed. This may not satisfy the response time needs of some customers.

Moreover with respect to IP address assignments, a GGSN may assign an IP address to an ME without requesting DHCP service in response to a proposed IP address request from the ME (e.g., where the proposed IP address is a static IP address configuration in the ME). Subsequently, another ME may submit a non-proposed IP address request wherein the GGSN requests DHCP service for dynamic assignment of an IP address for this ME. In some cases, the DHCP server may assign the same IP address as the IP address that is statically configured in the initial ME. This overlap in IP addresses may result in future non-proposed IP address requests to be rejected since the same IP address will be assigned by the DHCP server to any future incoming MEs, and the GGSN will reject the PDP context requests associated with those future incoming MEs because that IP address has already been assigned to the first ME.

Thus, there exists a need for methods and apparatus in a packet data network that address the above shortcomings.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Before describing in detail embodiments that are in accordance with the present invention, it should be observed that the embodiments reside primarily in combinations of method steps and apparatus components related to methods and apparatus for use in a packet data network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Generally speaking, pursuant to the various embodiments, methods and apparatus for use in a packet data network are described. In one embodiment the packet data network is a GPRS network, wherein the infrastructure comprises at least one SGSN and at least one GGSN. When a first ME wants to communicate with a host in a Customer Enterprise Network (CEN), the first ME requests a session creation via a radio network. In a first embodiment, the radio network communicates the session request to an SGSN which in turn requests that a PDP context for the first ME be created with a GGSN. Where the GGSN uses DHCP service to request network access configuration parameters for the first ME, in accordance with embodiments herein the PDP context and the session creation may be completed prior to the completion of a four-way handshake between the GGSN and a DHCP server for assigning the network access configuration parameters for the first ME. This enables an improved session creation response time over existing art.

In another embodiment, the first ME requests the session creation and the request comprises a proposed IP address, wherein the PDP context is created with the GGSN and the session is created without the GGSN requesting DHCP service. When a subsequent ME requests a session, wherein the session request does not propose an IP address, and upon the GGSN obtaining from the DHCP server (in response to a first request) the same IP address for the subsequent ME as was assigned the first ME, the GGSN can: release this IP address; reserve it for the first ME with the DHCP server; request an IP address for the subsequent ME at a second time; and receive an IP address from the DHCP server for the subsequent ME that is different from the IP address assigned to the first ME. This decreases the likelihood, over the existing art, of the same IP address being assigned to two different MEs.

Those skilled in the art will realize that the above recognized advantages and other advantages described herein are merely exemplary and are not meant to be a complete rendering of all of the advantages of the various embodiments of the present invention.

Figure 1:
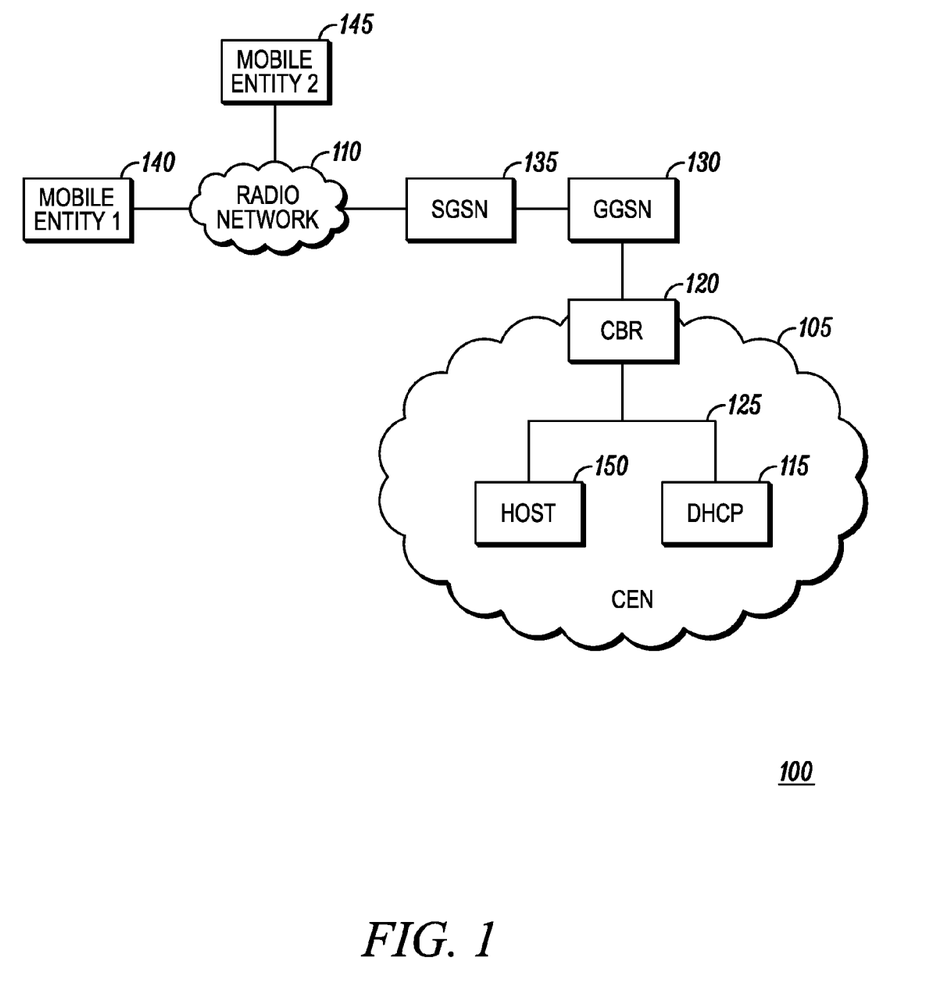
FIG. 1 is a block diagram of illustrative network in which may be implemented methods in accordance with embodiments of the present invention.

Referring now to the drawings, and in particular FIG. 1, an illustrative network in which may be implemented embodiments of the present invention is shown and indicated generally at 100. Network 100 comprises a Customer Enterprise Network (CEN) 105 that may be a private network owned by a Public Safety agency, for instance, and having a plurality of fixed entities and mobile entities having CEN 105 as their home network. Network 100 further comprises a radio network 110 that may be a public or a private network, such as a wireless GSM radio network or a Universal Mobile Telecommunications System (UMTS) radio network, coupled to CEN 105.

In general CEN 105 and radio network 110 comprise various infrastructure elements as is well known in the art. These infrastructure elements may include, but are not limited to, access points, base stations, various routers and servers (e.g., Authentication Authorization and Accounting (AAA) servers, VPN servers, DHCP servers, etc.) and the like. A DHCP server 115 (e.g., a server configured for running DHCP) and a customer border router (CBR) 120 comprising the infrastructure of CEN 105 are shown for illustrative purposes. In this illustration, DHCP server 115 and CBR 120 are shown connected to the same network segment 125.

Entities, especially mobile entities, which communicate using network 100 may communicate many different forms of information including voice, data, audio, video, etc. For example, some entities that may be configured to communicate voice via radio network 110 may be further configured to communicate data, for instances in the form of IP packets or IP datagrams using a packet data network. One example of a packet data network is a GPRS network. Illustrative network 100 includes a GPRS network coupling CEN 105 and radio network 110. As illustrated, the GPRS network comprises an SGSN 135 coupled to radio network 110 (e.g., via a direct or indirect connection to a base station and/or CBR (not shown) comprising radio network 110) and a GGSN 130 coupled to SGSN 135 and CBR 120 (both illustratively shown in FIG. 1 as direct connections). Only one SGSN and one GGSN is shown for illustrative purposes. However, those of ordinary skill in the art will realize that a plurality (two or more) of either or both elements may comprise a GRPS network depending on factors including cost constraints, size of the network needed to accommodate user demand, etc. Moreover, skilled artisans will realize that although SGSN 135 and GGSN 130 are illustrated as separate logical and physical entities. These logical entities may be co-located in a common physical entity. In addition, multiple SGSNs and GGSNs and combinations thereof may be physically co-located on a common device or apparatus.

Both SGSN 135 and GGSN 130 may be routers that comprise suitable software and hardware (e.g., memory for storing executable code (e.g. software), one or more processors for executing the stored code, ASICs or a combination thereof) to perform their functionality. Moreover, both SGSN 135 and GGSN 130 are normally configured in accordance with standard GPRS for performing GPRS Tunneling Protocol (GTP) that enable end users of the radio network (e.g., mobile entities) to move from place to place within network 100 and radio network 110 while continuing to connect to CEN 105 (for instance) as if from one location at the GGSN. GTP is used, for example, to setup and delete PDP contexts, verify SGSN and GGSN reachability, updates for subscribers (used interchangeably herein with the term MEs), e.g., as subscribers move from one SGSN to another, etc.

Accordingly, SGSN 135 may be configured to perform functions including, but not limited to: detunneling GTP packets from the GGSN (downlink); tunneling IP packets toward the GGSN (uplink); carrying out mobility management as a ME move from one routing area to another; encrypting downlink data and decrypting uplink data; etc. GGSN 130 may be configured to perform functions including, but not limited to, detunneling GTP packets to send out normal user data IP packets; tunneling IP packets toward the SGSN; communicating with the DHCP server for obtaining network access configuration parameters for a ME (using a DHCP client included in the GGSN); implementing one or more of the methods described by reference to FIGS. 2 and 3; etc.

Those skilled in the art will recognize and appreciate that the specifics of this illustrative example are not specifics of the invention itself and that the teachings set forth herein are applicable in a variety of alternative network topologies. For example, since the teachings described do not depend on the type of network topology (including the number and type of infrastructure elements contained therein), they can be applied to any type of network topology. As such, other alternative implementations of using different types of network topologies including ones associated with other types of networks such as Wide Area Networks (WANs), Vehicular Access Networks (VANs), the Internet, etc. are contemplated and are within the scope of the various teachings described herein. Moreover, although a GPRS packet data network is illustratively described, alternative implementations and embodiments using other types of packet data networks such as, for instance, Remote Access Server (RAS), Cellular Digital Packet Data (CDPD), Packet Radio Messaging System are contemplated and are within the scope of the various teachings described herein.

Entities, including both fixed and mobile entities, may use network 100 for communicating information, for instance, in the form of packets. Illustrated in FIG. 1 are a mobile entity 1 (140), a mobile entity 2 (145) both attached to radio network 110 and a fixed host 150 attached to CEN 105 to network segment 125. In one embodiment, CEN 105 is the home network for all three entities. A fixed entity or node is either a host (no forwarding functionality) or a router (forwarding functionality) that is unable to change its point of attachment to network 100 or change its IP address without breaking open sessions. A mobile entity or node, however, is defined herein as a device that is capable of changing its point of attachment to network 100 without breaking open sessions, for instance by being configured for using Mobile IP in accordance with protocols described in RFC 3344 titled "IP Mobility Support for IPv4" (also commonly referred to in the art as MIPv4 and wherein IPv4 is described in RFC 791) and in RFC 3775 titled "Mobility Support in IPv6" (also commonly referred to in the art as MIPv6 and wherein IPv6 is described in RFC 2460).

Mobile entity 140, mobile entity 145 and host 150 usually each comprise suitable software and hardware (e.g., memory for storing executable code (e.g. software), one or more processors for executing the stored code, ASICs or a combination thereof) to perform their functionality. Mobile entities 140 and 145 also typically further comprise a suitable transceiver and interfaces for transmitting and receiving packets within network 100, a Point to Point Protocol (PPP) client for requesting communication sessions, etc.

Figure 2:
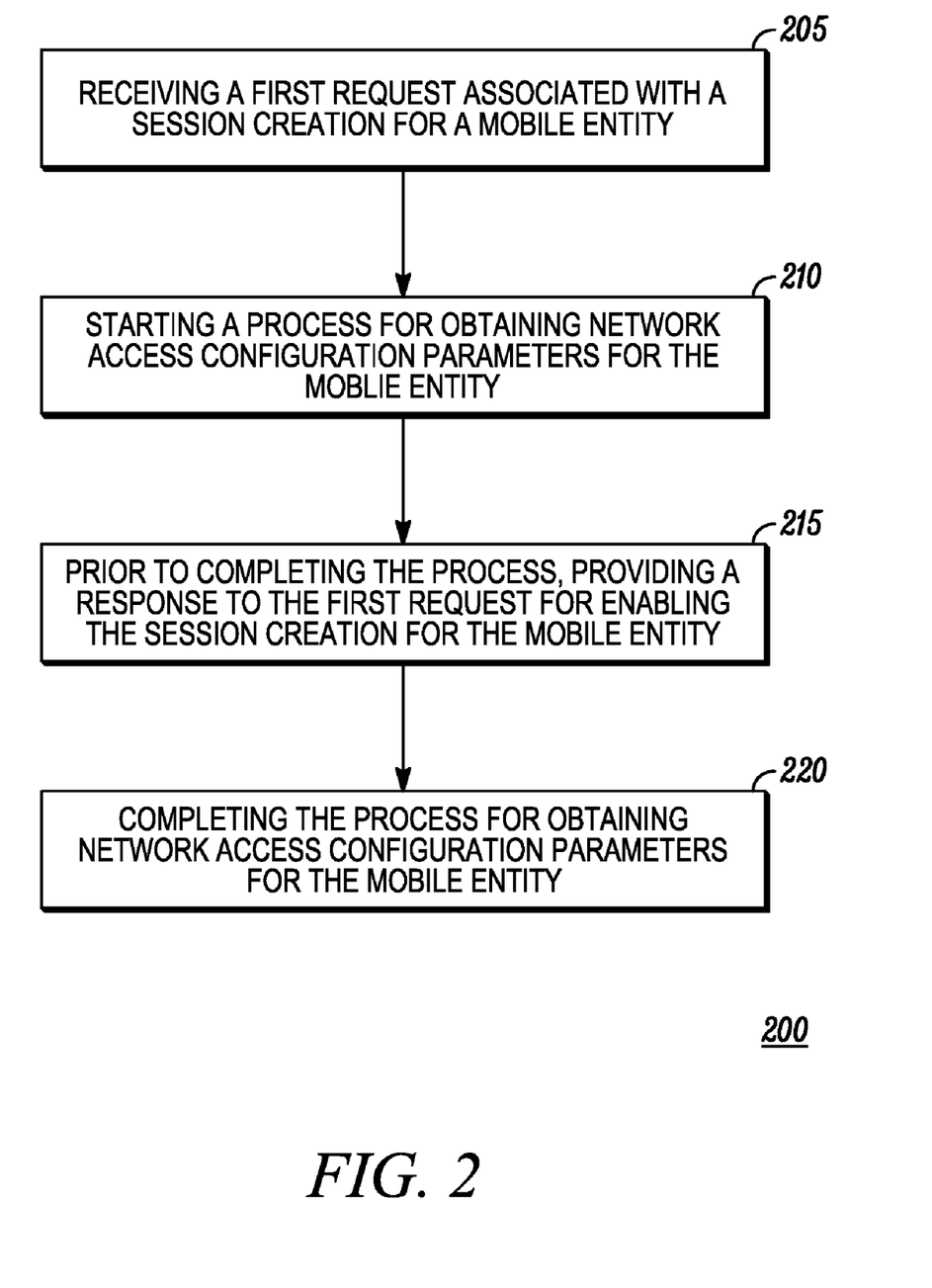
FIG. 2 is a flow diagram illustrating a method in accordance with an embodiment of the present invention.
Figure 3:
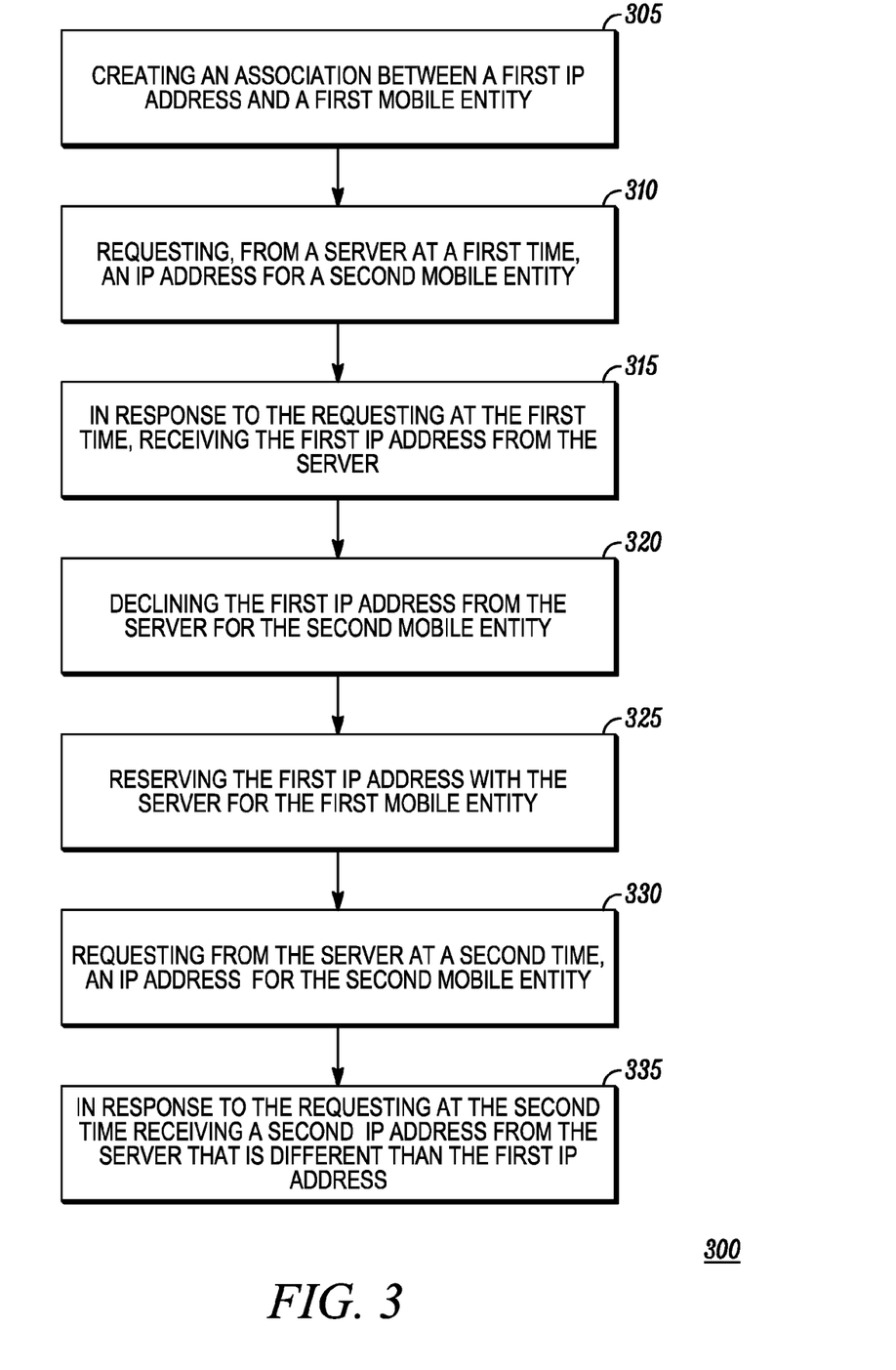
FIG. 3 is a flow diagram illustrating a method in accordance with an embodiment of the present invention.

FIGS. 2 and 3 illustrate flow diagrams of methods 200 and 300, respectively, in accordance with embodiments of the present invention. Methods 200 and 300 may be performed, for instance, in GGSN 130. Method 200 in general comprises the steps of: receiving (205) a first request associated with a session creation for a mobile entity; starting (210) a process for obtaining network access configuration parameters for the mobile entity; prior to completing the process for obtaining network access configuration parameters, providing (215) a response to the first request for enabling the session creation for the mobile entity to be completed; and completing (220) the process for obtaining network access configuration parameters for the mobile entity. Method 300 in general comprises the steps of: creating (305) an association between a first IP address and a first mobile entity; requesting (310), from a server at a first time, an IP address for a second mobile entity; in response to the requesting at the first time, receiving (315) the first IP address from the server; declining (320) the first IP address with the server for the second mobile entity; reserving (325) the first IP address with the server for the first mobile entity; requesting (330), from the server at a second time, an IP address for the second mobile entity; and in response to the requesting at the second time, receiving (335) a second IP address from the server for the second mobile entity that is different from the first IP address associated with the first mobile entity.

Figure 4:
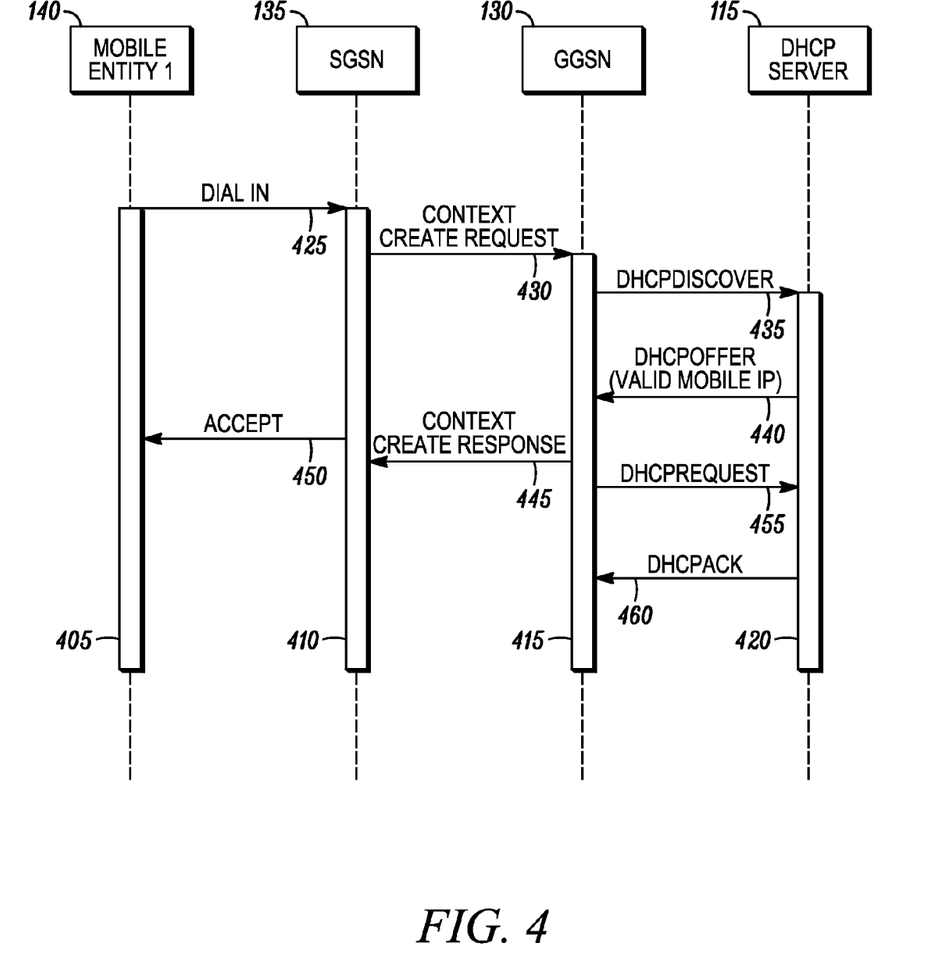
FIG. 4 is an illustrative signaling flow for implementing the method illustrated in FIG. 2.

Turning now to FIG. 4, an illustrative signaling flow implementing method 200 is shown. This signaling flow is described by reference to FIG. 1, wherein the packet data network implemented is a GPRS network. Bar 405 represents signaling to and from mobile entity 140. Bar 410 represents signaling to and from SGSN 135. Bar 415 represents signaling to and from GGSN 130. Bar 420 represents signaling to and from DHCP server 115.

When mobile entity 140, for instance, wants to communicate data packets to host 150, it dials in to radio network 110 and requests a session (425) to ultimately result in a session being created for the communications. The session request may be performed using known protocols such as, for instance, Point to Point Protocol as described in RFC 1661 titled "PPP: The Point-to-Point Protocol". Responsive to the session request, network 110 communicates with SGSN 135 (e.g., via transmission of the session request), which transmits a PDP Context Request (430) in accordance with standard GTP that is received by GGSN 130. Responsive thereto, GGSN 130 uses DHCP service to begin a process for obtaining network access configuration parameters for mobile entity 140 (e.g., a mobile IP address). The process for obtaining network access configuration parameters in this instance comprises a four-way message exchange between GGSN 130 and DHCP 115, which GGSN 130 begins by sending a standard DHCPDISCOVER message (435) corresponding to mobile entity 140 to DHCP server 115. In response thereto, GGSN receives a standard DHCPOFFER message (440) from DHCP server 115 comprising an offer of network access configuration parameters for mobile entity 140 that includes at least an offer of a valid IP address for mobile entity 140.

Upon receiving the DHCPOFFER message and prior to the completion of the four-way message exchange, GGSN 140 sends a standard PDP Context Response (445) to SGSN 135 comprising at least the IP address offered by the DHCP server to enable SGSN 135 to continue its functionality to facilitate the session acceptance (450) and resulting session creation completion to support communications between mobile entity 140 and host 150. GGSN 130 further proceeds to send a standard DHCPREQUEST message (455) to DHCP server 115 requesting the offered network access configuration parameters. Whereupon, GGSN 130 receives a standard DHCPACK message (460) from DHCP server 115 that acknowledges commitment by DHCP server 115 of the offered parameters for mobile entity 140, which completes the four-way message exchange and, thereby, completes the process for obtaining network access configuration parameters for mobile entity 140.

Figure 5:
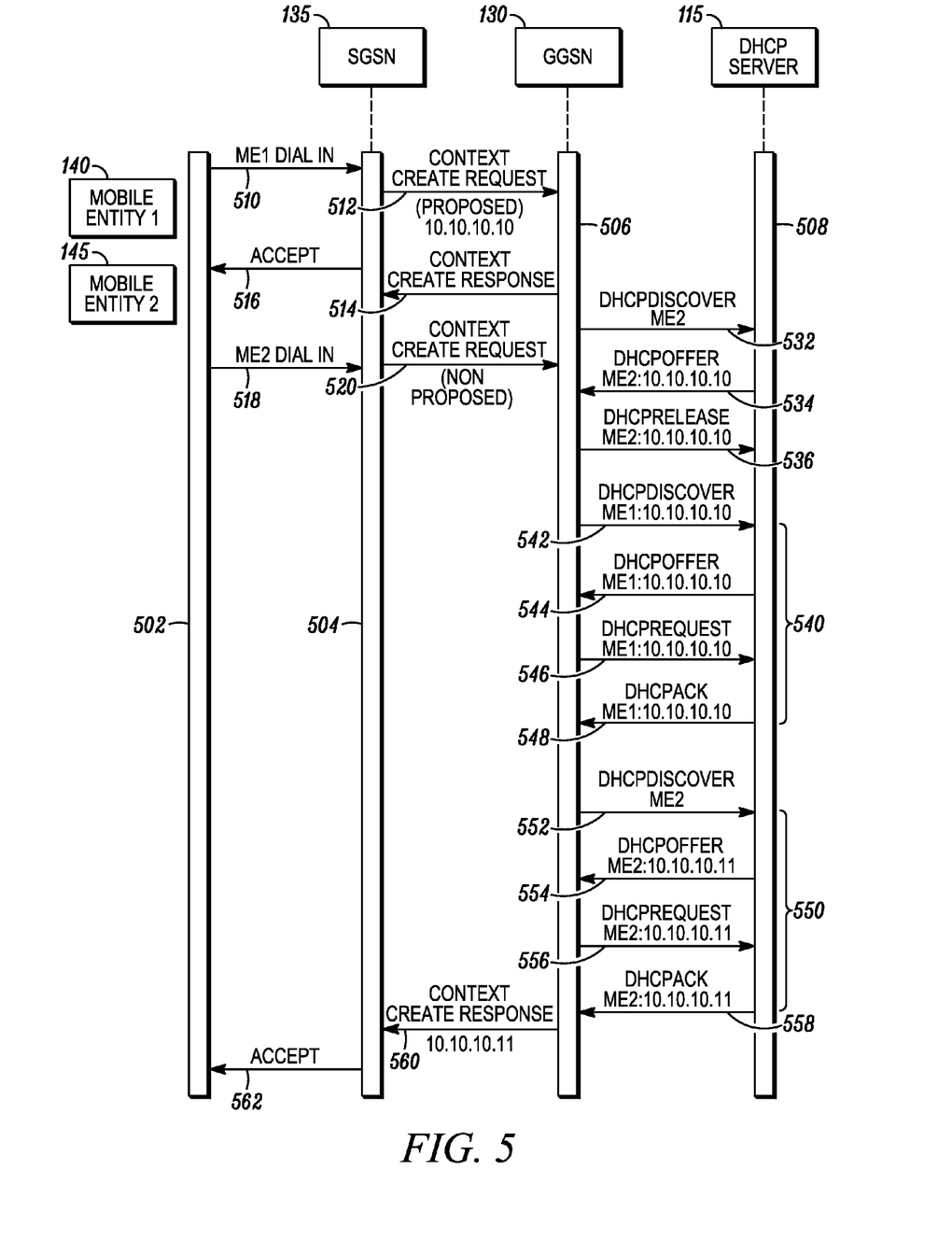
FIG. 5 is an illustrative signaling flow for implementing the method illustrated in FIG. 3.

Turning now to FIG. 5, an illustrative signaling flow implementing method 300 is shown. This signaling flow is described by reference to FIG. 1, wherein the packet data network implemented is a GPRS network. Bar 502 represents signaling to and from mobile entities 140 and 145. Bar 504 represents signaling to and from SGSN 135. Bar 506 represents signaling to and from GGSN 130. Bar 508 represents signaling to and from DHCP server 115.

When mobile entity 140, for instance, wants to communicate data packets to host 150, it dials in to radio network 110 and requests a session (510) to ultimately result in a session being created for the communications. In this embodiment, the session request is associated with and/or comprises a predetermined or proposed IP address (e.g., an IP address statically configured in mobile entity 140) for use by mobile entity 140 for communicating during the session. The session request may be performed using known protocols such as, for instance, PPP. Responsive to the session request, network 110 communicates with SGSN 135 (e.g., via transmission of the session request), which transmits a PDP Context Request (512) comprising the proposed IP address for mobile entity 140 (e.g., 10.10.10.10) in accordance with standard GTP, which is received by GGSN 130. Responsive thereto, GGSN without the use of DHCP service may create an association (in this instance a PDP Context) between the proposed IP address 10.10.10.10 and mobile entity 140 by sending a standard PDP Context Response comprising at least IP address 10.10.10.10 to SGSN 135 (514). This enables SGSN 135 to continue its functionality to facilitate the session acceptance (516) and resulting session creation completion to support communications between mobile entity 140 and host 150.

Thereafter, when mobile entity 145 wants to communicate data packets to a host in CEN 105 such as host 150 (or another entity connected to CEN 105 and not shown), it dials in to radio network 110 and requests a session (518) to ultimately result in a session being created for the communications. In this embodiment, the session request is not associated with a predetermined or proposed IP address for use by mobile entity 145 for communicating during the session. The session request may be performed using known protocols such as, for instance, PPP. Responsive to the session request, network 110 communicates with SGSN 135 (e.g., via transmission of the session request), which transmits a PDP Context Request (520) for mobile entity 145 in accordance with standard GTP, which is received by GGSN 130.

Responsive thereto, GGSN 130 uses DHCP service to request from DHCP server 115 (at a first time) network access configuration parameters including an IP address for mobile entity 145, by sending a standard DHCPDISCOVER message (532) corresponding to mobile entity 145 to DHCP server 115. In this instance, GGSN receives in response thereto a DHCPOFFER message (534) comprising or offering IP address 10.10.10.10 for mobile entity 145, which of course is the same IP address being used by mobile entity 140. Since GGSN has this IP address associated with mobile entity 140, it declines IP address 10.10.10.10 from DHCP server 115 for mobile entity 145 by sending a DHCPRELEASE message (536) to DHCP server 115 comprising IP address 10.10.10.10.

So that DHCP server 115 will not continue to offer IP address 10.10.10.10 for mobile entities other than mobile entity 140, GGSN 130 "reserves" this IP address with DHCP server 115 for mobile entity 140. This is done using a four-way message exchange (540) between GGSN 130 and DHCP server 115. Message exchange 540 comprises: a DHCPDISCOVER message (542) from GGSN 130 to DHCP server 115 requesting network access configuration parameters for mobile entity 140 including the specific IP address 10.10.10.10; a DHCPOFFER message (544) from DHCP server 115 to GGSN 130 offering IP address 10.10.10.10 for mobile entity 140; a DHCPREQUEST message (546) from GGSN 130 to DHCP server 115 requesting the offered IP address; and a DHCPACK message (548) from DHCP server 115 to GGSN 130 that acknowledges commitment by DHCP server 115 of the offered IP address 10.10.10.10 for mobile entity 140.

Since mobile entity 145 has not been allotted an IP address, using a four-way message exchange (550) GGSN 130 requests (at a second time) from DHCP server 115 network access configuration parameters including an IP address for mobile entity 145 and receives an IP address that is different from 10.10.10.10 (e.g., 10.10.10.11). Message exchange 550 comprises: a DHCPDISCOVER message (552) from GGSN 130 to DHCP server 115 requesting network access configuration parameters for mobile entity 145 including an IP address; a DHCPOFFER message (554) from DHCP server 115 to GGSN 130 offering IP address 10.10.10.11 for mobile entity 145; a DHCPREQUEST message (556) from GGSN 130 to DHCP server 115 requesting the offered IP address; and a DHCPACK message (558) from DHCP server 115 to GGSN 130 that acknowledges commitment by DHCP server 115 of the offered IP address 10.10.10.11 for mobile entity 145. Upon receiving either the DHCPOFFER message or the DHCPACK message comprising IP address 10.10.10.11, GGSN 130 sends a standard PDP Context Response (560) to SGSN 135 corresponding to mobile entity 145 and comprising at least IP address 10.10.10.11 to enable SSGN 135 to continue its functionality to facilitate the session acceptance (562) and resultant session creation completion to support communications between mobile entity 145 and host 150.

In the foregoing specification, specific embodiments of the present invention have been described. However, one of ordinary skill in the art appreciates that various modifications and changes can be made without departing from the scope of the present invention as set forth in the claims below. For example, a single logical GGSN may perform both methods 200 and 300, or only one or the other of methods 200 and 300 might be performed in a single network. However, it should be understood that cooperatively implementing both methods will result in more benefits being realized in the implementation of the embodiments described herein. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the methods and apparatus for use in a packet data network described herein. The non-processor circuits may include, but are not limited to, a receiver, a transmitter, power source circuits, and user input devices. As such, these functions may be interpreted as steps of methods for use in a packet data network described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

What is claimed is:

1. A method for enabling accelerated session creation for a mobile entity comprising the steps of:
   receiving a first request associated with a session creation for a mobile entity;
   in response to the first request, starting a process for obtaining network access configuration parameters for the mobile entity, wherein the process comprises receiving an offer of network access configuration parameters for the mobile entity;
   prior to completing the process, providing a response to the first request for enabling the session creation for the mobile entity to be completed using the offered network access configuration parameters; and
   completing the process for obtaining network access configuration parameters for the mobile entity, wherein completing the process comprises obtaining an acknowledgement for commitment of the offered network access configuration parameters for the mobile entity.

2. The method of claim 1, wherein the process for obtaining network access configuration parameters comprises a four-way message exchange, the four-way message exchange comprising a DHCPDISCOVER message requesting the offer for network access configuration parameters, a DHCPOFFER message comprising the offer for the network access configuration parameters, a DHCPREQUEST message requesting the offered network access configuration parameters and a DHCPACK message including the acknowledgement for commitment of the offered parameters for the mobile entity.

3. The method of claim 2, wherein the response to the first request is provided after the DHCPDISCOVER and DHCPOFFER messages are exchanged and before the DHCPREQUEST and DHCPACK messages are exchanged.

4. The method of claim 1, wherein the first request is a Context Create Request and the response to the first request is a Context Create Response.

5. The method of claim 1, wherein receiving an offer of network access configuration parameters comprises receiving an offer of at least an Internet Protocol address for the mobile entity, and further wherein completing the process for obtaining network access configuration parameters for the mobile entity comprises obtaining acknowledgement for commitment of the Internet Protocol address for the mobile entity.

6. Apparatus for enabling accelerated session creation for a mobile entity, the apparatus comprising:
   a memory; and
   a processor coupled to the memory, the processor executing software stored in the memory causing the apparatus to perform the steps of:
   receiving a first request associated with a session creation for a mobile entity;
   starting a process for obtaining network access configuration parameters for the mobile entity, the process comprising a four-way message exchange comprising a DHCPDISCOVER message, a DHCPOFFER message, a DHCPREQUEST message and a DHCPACK message;
   prior to completing the process, providing a response to the first request for enabling the session creation for the mobile entity to be completed using the network access configuration parameters offered via the DHCPOFFER message, wherein the response to the first request is provided after the DHCPDISCOVER and DHCPOFFER messages are exchanged and before the DHCPREQUEST and DHCPACK messages are exchanged; and
   completing the process for obtaining network access configuration parameters for the mobile entity, wherein completing the process comprises receiving the DHCPACK message for commitment of the offered network access configuration parameters for the mobile entity.

7. The apparatus of claim 6, wherein the apparatus comprises a Gateway GPRS (General Packet Radio Service) Support Node.

8. The apparatus of claim 6, wherein the apparatus is configured for performing GPRS (General Packet Radio Service) Tunneling Protocol.

9. The apparatus of claim 6, wherein the apparatus is configured for performing Dynamic Host Configuration Protocol for starting and completing the process for obtaining network access configuration parameters for the mobile entity.

10. The apparatus of claim 6, wherein the apparatus communicates with a Serving GPRS (General Packet Radio Service) Support Node for receiving the first request and providing the response to the first request.

11. A method for resolving network access configuration parameters comprising the steps of:
   creating an association between a first Internet Protocol (IP) address and a first mobile entity;
   requesting, from a server at a first time, an IP address to be assigned to a second mobile entity;
   in response to the requesting an IP address to be assigned to the second mobile entity at the first time, receiving the first IP address from the server;
   declining the first IP address with the server for the second mobile entity based on the association between the first IP address and the first mobile entity;
   reserving the first IP address with the server for the first mobile entity;
   requesting, from the server at a second time, an IP address to be assigned to the second mobile entity; and
   in response to the requesting at the second time, receiving a second IP address from the server to be assigned to the second mobile entity that is different from the first IP address associated with the first mobile entity;
   wherein the method comprises a message sequence in accordance with Dynamic Host Configuration Protocol;
   wherein the message sequence comprises:
   communicating a DHCPDISCOVER message, to the server at the first time, requesting an IP address for the second mobile entity and in response thereto receiving a DHCPOFFER message comprising the first IP address;
   communicating a DHCPRELEASE message to the server declining the first IP address for the second mobile entity;
   communicating a DHCPDISCOVER message to the server requesting the first IP address for the first mobile entity and in response thereto receiving a DHCPOFFER message comprising the first IP address:
   communicating a DHCPREQUEST message to the server and in response thereto receiving a DHCPACK message reserving the first IP address for the first mobile entity;
   communicating a DHCPDISCOVER message, to the server at the second time, requesting an IP address for the second mobile entity and in response thereto receiving a DHCPOFFER message comprising the second IP address; and communicating a DHCPREQUEST message to the server and in response thereto receiving a DHCPACK message reserving the second IP address for the second mobile entity.

12. The method of claim 11, wherein the step of creating an association between the first IP address and the first mobile entity comprises the steps of:

receiving a Context Create message associated with the first mobile entity and requesting the use of the first IP address for the first mobile entity;

providing a Context Create response accepting use of the first IP address for the first mobile entity; and creating a Context for the first mobile entity comprising at least the first IP address.

13. The method of claim 11, wherein the step of requesting from the server, at the first time, an IP address for the second mobile entity is performed in response to receiving a Context Create request associated with the second mobile entity, the method further comprising the step of providing a Context Create Response associated with the second mobile entity and comprising at least the second IP address.

* * * * *

UNITED STATES PATENT AND TRADEMARK OFFICE
CERTIFICATE OF CORRECTION

| | | |
|---|---|---|
| PATENT NO. | : 8,184,618 B2 | Page 1 of 1 |
| APPLICATION NO. | : 11/537795 | |
| DATED | : May 22, 2012 | |
| INVENTOR(S) | : Sun et al. | |

It is certified that error appears in the above-identified patent and that said Letters Patent is hereby corrected as shown below:

In Column 4, Lines 6, delete "GRPS" and insert -- GPRS --, therefor.

In Column 7, Lines 61, delete "SSGN" and insert -- SGSN --, therefor.

Signed and Sealed this
Eighth Day of January, 2013

David J. Kappos
*Director of the United States Patent and Trademark Office*